(12) United States Patent
Fox-Roberts et al.

(10) Patent No.: US 11,810,316 B2
(45) Date of Patent: *Nov. 7, 2023

(54) 3D RECONSTRUCTION USING WIDE-ANGLE IMAGING DEVICES

(71) Applicant: Snap Inc., Santa Monica, CA (US)

(72) Inventors: Patrick Fox-Roberts, Witham (GB); Richard McCormack, Princes Risborough (GB); Qi Pan, London (GB); Edward James Rosten, London (GB)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/714,720

(22) Filed: Apr. 6, 2022

(65) Prior Publication Data
US 2022/0230351 A1 Jul. 21, 2022

Related U.S. Application Data

(63) Continuation of application No. 16/897,749, filed on Jun. 10, 2020, now Pat. No. 11,335,022.

(51) Int. Cl.
*G06T 7/70* (2017.01)
*G06T 3/00* (2006.01)
*G06T 5/00* (2006.01)

(52) U.S. Cl.
CPC .............. *G06T 7/70* (2017.01); *G06T 3/0093* (2013.01); *G06T 5/006* (2013.01); *G06T 2207/20216* (2013.01)

(58) Field of Classification Search
CPC ......... G06T 7/70; G06T 3/0093; G06T 5/006; G06T 2207/20216
(Continued)

(56) References Cited

U.S. PATENT DOCUMENTS 9,609,197 B1  3/2017 Stepanenko
11,335,022 B2 * 5/2022 Fox-Roberts ........... G06T 7/579
(Continued)

FOREIGN PATENT DOCUMENTS

CN    107871308 A    4/2018
CN    108335273 A    7/2018
(Continued)

OTHER PUBLICATIONS

"U.S. Appl. No. 16/897,749, Non Final Office Action dated Jul. 22, 2021", 11 pgs.
(Continued)

*Primary Examiner* — Ayodeji O Ayotunde
(74) *Attorney, Agent, or Firm* — Schwegman Lundberg & Woessner, P.A.

(57) ABSTRACT

The pose of a wide-angle image is determined by dewarping regions of the wide-angle image, determining estimated poses of the dewarped regions of the wide-angle image and deriving a pose of the wide-angle image from the estimated poses of the of the dewarped regions. The estimated poses of the dewarped regions may be determined by comparing features in the dewarped regions with features in prior dewarped regions from one or more prior wide-angle images, as well as by comparing features in the dewarped regions with features in a point cloud.

20 Claims, 9 Drawing Sheets

(58) Field of Classification Search
USPC .......................................................... 382/100
See application file for complete search history.

(56) References Cited

U.S. PATENT DOCUMENTS

| | | | |
|---|---|---|---|
| 2015/0125033 A1 | 5/2015 | Murphy et al. | |
| 2019/0325274 A1 | 10/2019 | Balan et al. | |
| 2021/0390729 A1 | 12/2021 | Fox-roberts et al. | |

FOREIGN PATENT DOCUMENTS

| | | |
|---|---|---|
| CN | 110276734 A | 9/2019 |
| CN | 115956255 | 4/2023 |
| WO | WO-2021252201 A2 | 12/2021 |
| WO | WO-2021252201 A3 | 12/2021 |

OTHER PUBLICATIONS

"U.S. Appl. No. 16/897,749, Notice of Allowance dated Jan. 12, 2022", 7 pgs.

"U.S. Appl. No. 16/897,749, PTO Response to Rule 312 Communication dated Feb. 18, 2022", 2 pgs.

"U.S. Appl. No. 16/897,749, Response filed Oct. 21, 2021 to Non Final Office Action dated Jul. 22, 2021", 9 pgs.

"International Application Serial No. PCT/US2021/034527, International Search Report dated Sep. 17, 2021", 5 pgs.

"International Application Serial No. PCT/US2021/034527, Written Opinion dated Sep. 17, 2021", 6 pgs.

Forster, Christian, et al., "SVO: Semidirect Visual Odometry for Monocular and Multi camera Systems", IEEE Transactions on Robotics, IEEE Service Center, Piscataway, NJ, US, vol. 33, No. 2, (Apr. 1, 2017), 249-265.

Wang, Yahui, et al., "CubemapSLAM: A Piecewise-Pinhole Monocular Fisheye SLAM System", Advances in Databases and Information Systems; [Lecture Notes in Computer Science; Lect.Notes Computer], Springer International Publishing, CHAM, (May 26, 2019), 34-49.

"International Application Serial No. PCT US2021 034527, International Preliminary Report on Patentability dated Dec. 22, 2022", 8 pgs.

"Chinese Application Serial No. 202180049099.2, Office Action dated Aug. 23, 2023", w/ English Translation, 15 pgs.

* cited by examiner

3D RECONSTRUCTION USING WIDE-ANGLE IMAGING DEVICES

PRIORITY CLAIM

This application is a continuation of and claims the benefit of priority of U.S. patent application Ser. No. 16/897,749, filed Jun. 10, 2020, which is hereby incorporated by reference in its entirety.

TECHNICAL FIELD

Embodiments of the present disclosure relate generally to mobile computing technology and, more particularly, but not by way of limitation, to systems for presenting augmented reality (AR) content at a client device.

BACKGROUND

Augmented reality is an interactive experience of a real-world environment where the objects that reside in the real world are enhanced by computer-generated perceptual information, sometimes across multiple sensory modalities, including visual, auditory, haptic, somatosensory and olfactory. The primary value of augmented reality is the manner in which components of the digital world blend into a person's perception of the real world, not as a simple display of data, but through the integration of immersive sensations, which are perceived as natural parts of an environment.

AR systems may utilize a virtual 3D model for locating and tracking a user's AR device. 3D reconstruction is a technique that is used to infer the geometrical structure of a scene captured by a collection of images.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
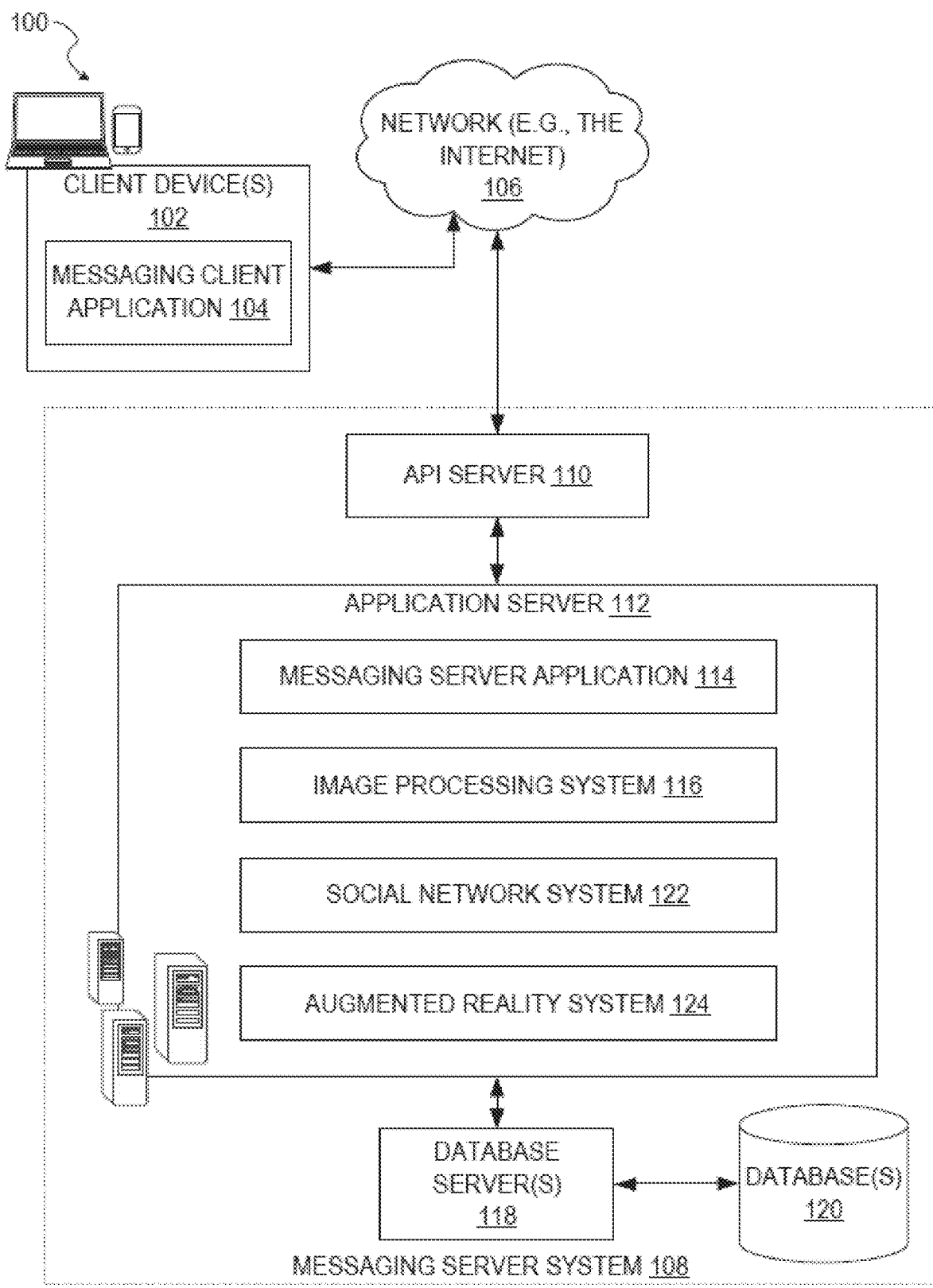
FIG. 1 is a block diagram showing an example messaging system for exchanging data (e.g., messages and associated content) over a network in accordance with some embodiments, wherein the messaging system includes an augmented reality system.

As discussed above, augmented reality (AR) is an interactive experience of a real-world environment where the objects that reside in the real world are enhanced by computer-generated perceptual information. Some AR systems make use of point clouds to generate and present AR content, wherein a point cloud is a set of data points that correspond to features and/or external surfaces of objects in the real world.

Structure from Motion (SfM) is a technique for estimating three-dimensional structures from two-dimensional image sequences. The output is a pose (i.e. the six degree-of-freedom position and orientation of the device that captured the image) for each image and a 3D point cloud where each point in the point cloud has descriptions of its appearance in two or more images. The general approach is:

Detect image features, such as corner points, in each image.
Match features between images.
Estimate the relative poses of image pairs with feature matches.
Starting with an initial image pair, triangulate image features to estimate their 3D locations.
Iteratively register new images by matching image features against the current 3D point cloud.
Triangulate the new image to add new points to the point cloud and optimize image poses and 3D point locations.

This process is unreliable when using wide-angle image sources, such as fisheye or 360-degree cameras, due to distortion of image features. The disclosure herein seeks to mitigate this unreliability by dewarping regions of wide-angle images received from such wide-angle sources and estimating poses for the dewarped regions using, in some examples, SfM techniques. The estimated poses for the dewarped regions can then be used to derive a pose for the wide-angle image and thus for the device that includes the wide-angle image source. As used herein, the term wide-angle is intended to cover the output from any imaging device that includes a deliberate distortion.

Improving the initial pose used to localize a device, and improving the tracking of a device post-localization, permits more accurate and/or more stable positioning of virtual objects (or other enhancing information) in images or in an image stream to be displayed on a display device. Accordingly, the methods and systems described herein improve the functioning of a device or system that includes augmented reality functionality or otherwise utilizes 3D reconstruction.

Accordingly, in certain example embodiments, a method of determining a pose of a wide-angle image using one or more processors is provided that includes dewarping regions of the wide-angle image, determining estimated poses of the dewarped regions of the wide-angle image, and deriving a pose of the wide-angle image from the estimated poses of the dewarped regions. Determining estimated poses of the dewarped regions may comprise comparing features in the dewarped regions with features in other regions that have been dewarped from one or more other wide-angle images. Determining the estimated poses may also comprise comparing features in the dewarped regions with features in a point cloud. Furthermore, the pose of the wide-angle image may be derived from an average of at least some of the estimated poses.

In some example embodiments, determining the estimated poses comprises determining a group of dewarped regions having consensus between their estimated poses, and deriving the pose of the wide-angle image from the estimated poses of the dewarped regions having such consensus. Consensus may be determined with reference to sensor data selected from the group consisting of motion sensor data and location sensor data. The poses of dewarped regions that are not in the group of dewarped regions having consensus between their estimated poses may then be derived from the pose of the wide-angle image.

In some example embodiments, the method further comprises optimizing the estimated poses of dewarped regions and then deriving an updated pose of the wide-angle image from at least some of the optimized estimated poses. The pose of the wide-angle image may then be optimized after optimizing the estimated poses of the dewarped regions.

In some example embodiments, a data processing system is provided comprising one or more processors, a wide-angle image capture device, and one or more machine-readable mediums storing instructions that, when executed by the one or more processors, cause the system to perform the operations described above, including but not limited to receiving a wide-angle image from the wide-angle image capture device, dewarping regions of the wide-angle image, determining estimated poses of the dewarped regions of the wide-angle image, and deriving a pose of the wide-angle image from the estimated poses of the dewarped regions.

In some example embodiments, a non-transitory machine-readable medium is provided that including instructions which, when read by a machine, cause the machine to perform the operations described above, including but not limited to receiving a wide-angle image from an image capture device, dewarping regions of the wide-angle image, determining estimated poses of the dewarped regions of the wide-angle image, and deriving a pose of the wide-angle image from the estimated poses of the dewarped regions.

FIG. 1 is a block diagram showing an example messaging system 100 for exchanging data (e.g., messages and associated content) over a network. The messaging system 100 includes one or more client devices 102, which host a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via GUIs of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and an AR system 124. The AR system 124 is configured to generate and/or host a point cloud based on image data, according to certain example embodiments. In some embodiments the AR system 124 is located in the application server 112 as shown, but the AR system may also be hosted partly or entirely on the client device 102. Further details of the AR system 124 can be found in FIG. 3 below.

The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
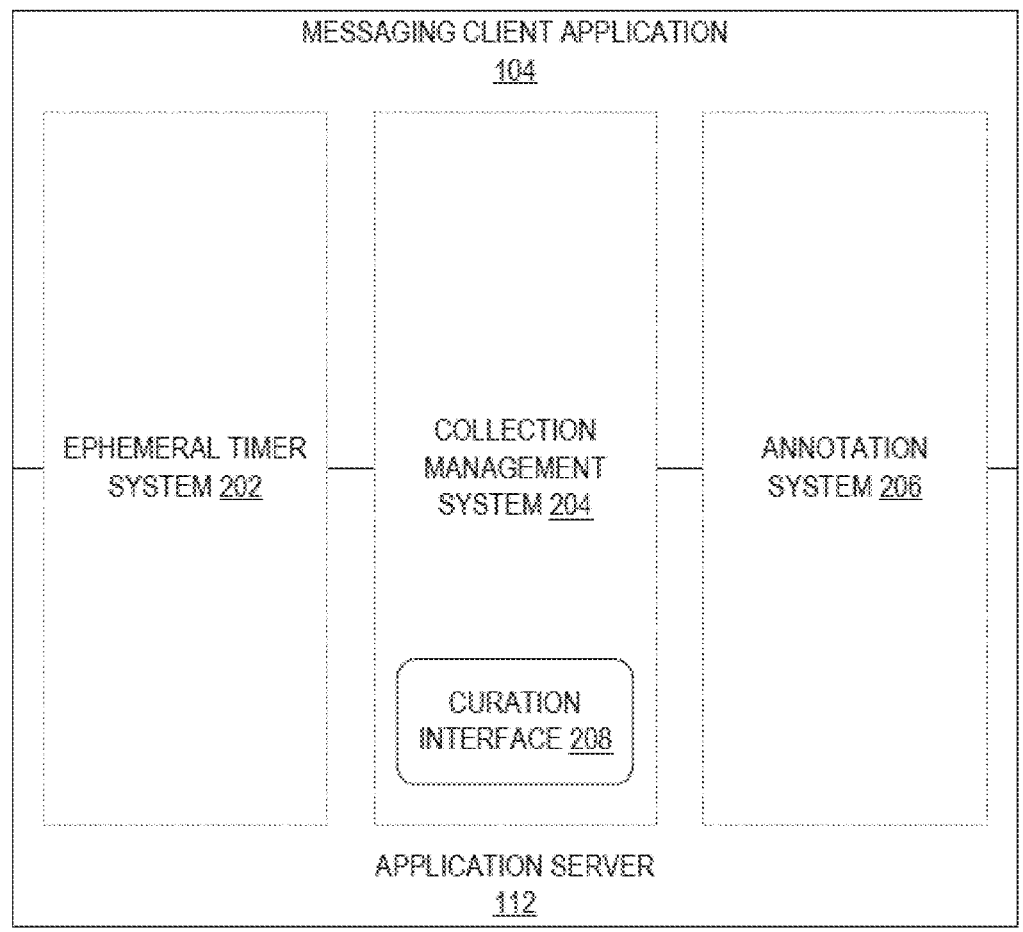
FIG. 2 is block diagram illustrating further details regarding a messaging system, according to example embodiments.

FIG. 2 is a block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, collection of messages (e.g., a collection of media), or graphical element, selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a filter, lens) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects, as well as animated facial models. An example of a visual effect includes color overlaying. The audio and visual content or the visual effects can be applied to a media content item (e.g., a photo or video) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time.

Figure 3:
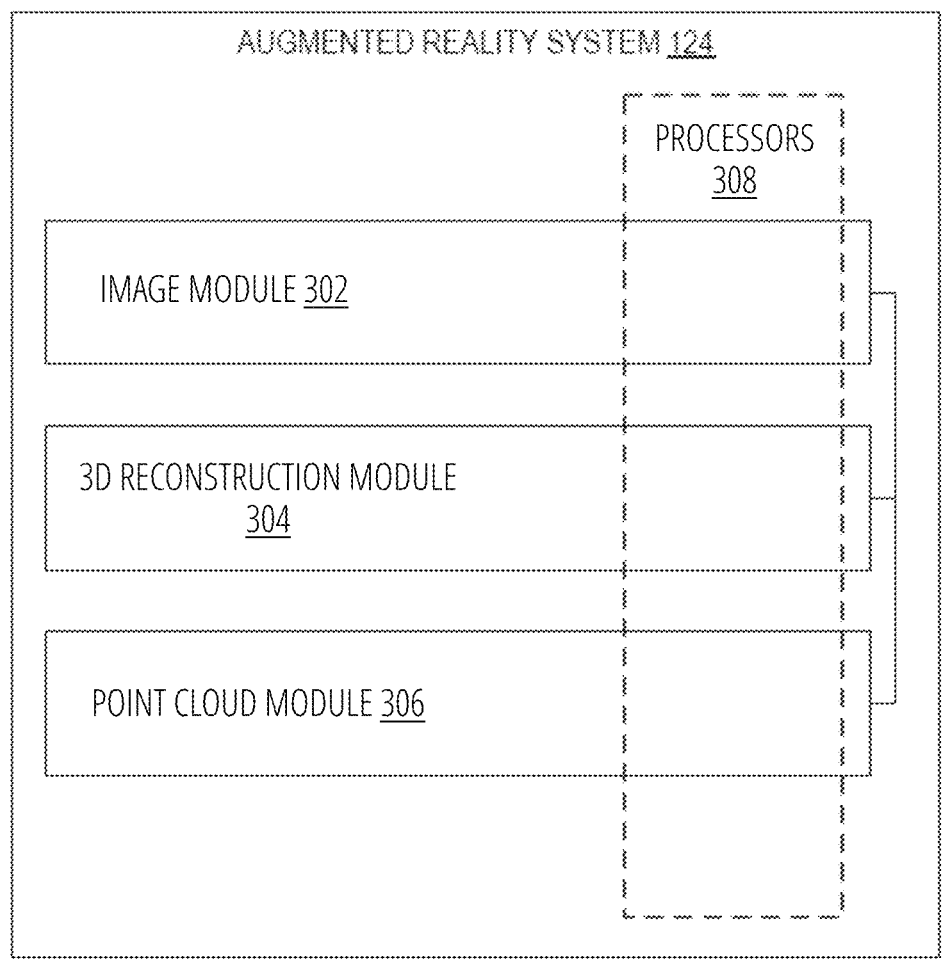
FIG. 3 is a block diagram illustrating various modules of an augmented reality system, according to certain example embodiments.

FIG. 3 is a block diagram illustrating components of the AR system 124 that configure the AR system 124 to perform operations to generate AR parameters and execute AR functionality, according to certain example embodiments.

The AR system 124 is shown in one example as including an image module 302, a 3D reconstruction module 304, and a point cloud module 306, all configured to communicate with each other (e.g., via a bus, shared memory, or a switch). Any one or more of these modules may be implemented using one or more processors 308, (e.g. by configuring such one or more processors to perform functions described for that module) and hence may include one or more of the processors 308. The image module 302 is used to dewarp and segment images received from a wide-angle lens, e.g. from a fisheye, 360-degree panoramic lens or other lens that includes a deliberate distortion. The 3D reconstruction module 304 is used to generate poses and 3D point data as described below in more detail. The point cloud module 306 is used to store 3D point cloud data generated by the 3D reconstruction module 304, but may also at other times download and store a portion of an existing 3D cloud module, based on the GPS coordinates of the client device 102.

Any one or more of the modules described may be implemented using hardware alone (e.g., one or more of the processors 308 of a machine) or a combination of hardware and software. For example, any module described of the AR system 124 may physically include an arrangement of one or more of the processors 308 (e.g., a subset of or among the one or more processors of the machine) configured to perform the operations described herein for that module. As another example, any module of the AR system 124 may include software, hardware, or both, that configure an arrangement of one or more processors 308 (e.g., among the one or more processors of the machine) to perform the operations described herein for that module. Accordingly, different modules of the AR system 124 may include and configure different arrangements of such processors 308 or a single arrangement of such processors 308 at different points in time. Moreover, any two or more modules of the AR system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 4:
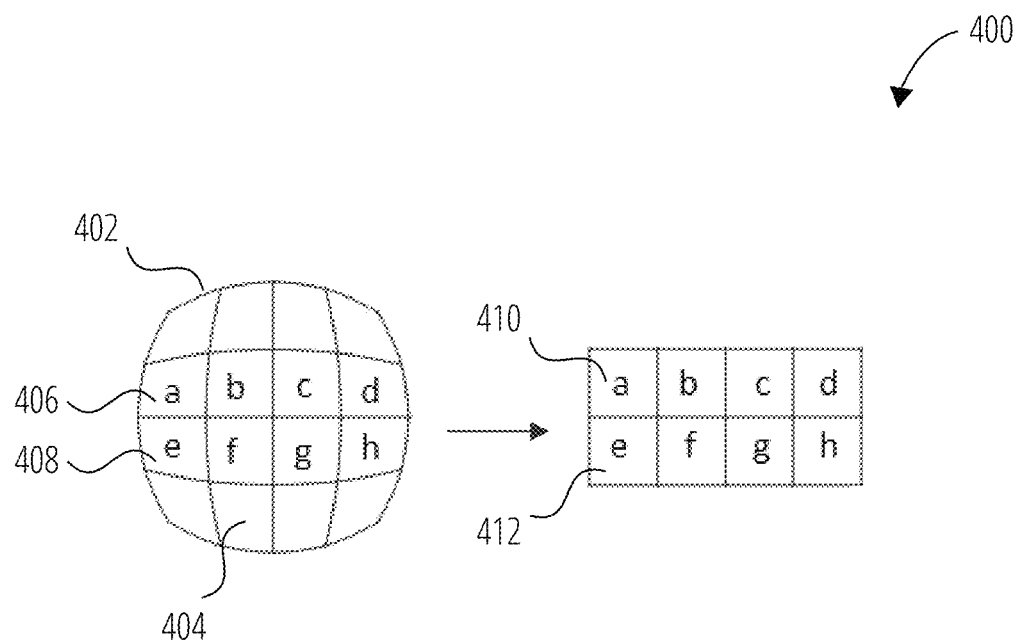
FIG. 4 illustrates the dewarping of a wide-angle image to a number of linearly rectified images.

FIG. 4 illustrates the dewarping 400 of a wide-angle image 402 (e.g. from a fisheye, 360-degree panoramic lens or other lens that includes a deliberate distortion) to one or more linearly rectified images that correspond to at least a portion of the wide-angle image 402.

As can be seen, the wide-angle image 402 includes a number of regions 404, 406, 408 that are distorted as a result of being generated using a wide-angle lens. In the illustrated embodiment, the wide-angle image 402 includes central regions of interest 406, 408 etc. as indicated by the letters "a" to "h". Using known techniques for dewarping, and depending on the nature of the wide-angle lens, these regions can be dewarped and linearized by the image module 302 as shown in FIG. 4. For example, region 406 and region 408 are transformed to dewarped region 410 and dewarped region 412 respectively.

The dewarped regions, as illustrated by way of example in FIG. 4, have known relative poses. That is, the pose of each dewarped region 410, 412 etc. relative to the camera frame is known or defined. These relative poses are configurable and can be specified by the user.

Dewarped image regions will be referred to herein using the convention Nx, where N is the number of the wide-angle image that has been captured while x is the letter corresponding to the dewarped region. Note that while the dewarped regions in FIG. 4 are shown to be square, aligned and directly adjacent, this is not required. In some cases it may be desirable for the dewarped regions to overlap, since this may provide better frame-to-frame region matching as discussed below with reference to FIG. 6.

FIG. 5 schematically illustrates the processing of a number of points of view, as described in more detail in FIG. 6, with reference to a point cloud 502 that is created iteratively as described in more detail below. The point cloud 502 represents (in the illustrated example) a building. A number of dewarped regions 504 to 512 have been previously registered to the 3D model of the environment as described in more detail below. Each region 504 to 512 is represented as a rectangular pyramid, with the apex of the pyramid representing the location and orientation (i.e. the pose) of a virtual camera and the base of the pyramid representing a view of the point cloud 502 corresponding to a dewarped region Nx.

Each of the regions 504 to 514 and their corresponding poses are determined by performing the method described below, treating each dewarped region as an independent image. Matches between dewarped regions extracted from the same original wide-angle image are prevented however, as these matches can provide no useful information.

Figure 5A:
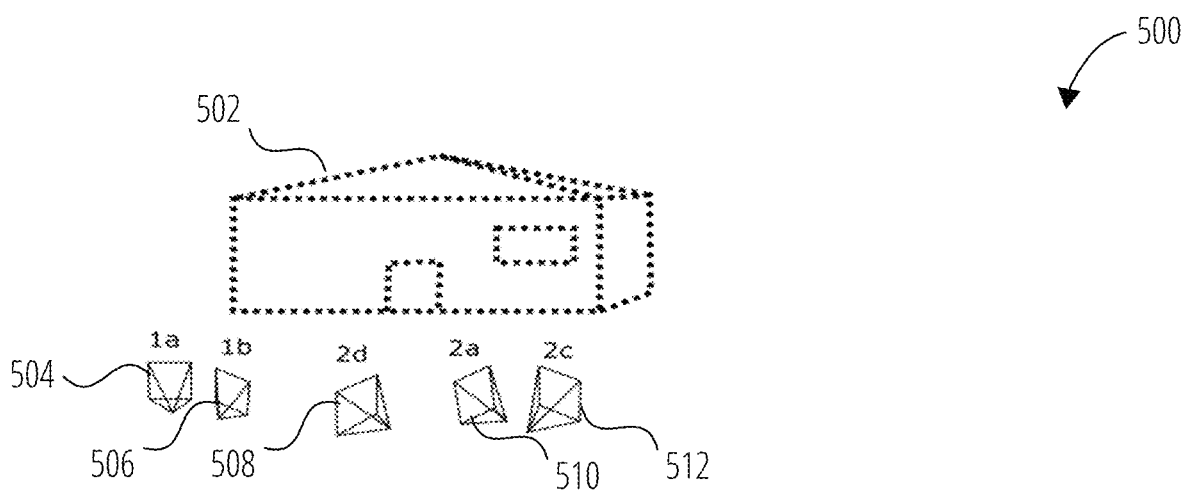
FIGS. 5A, 5B and 5C schematically illustrates the processing of a sequence of points of view with reference to a 3D point cloud.

For illustrative purposes, as shown in FIG. 5A, region 504 corresponds to dewarped region 1a, i.e. dewarped region a (412 in FIG. 4) in frame 1 of the input image, region 506 corresponds to dewarped region 1b, region 508 corresponds to dewarped region 2d, region 510 corresponds to dewarped region 2a, region 512 corresponds to dewarped region 2c and region 514 corresponds to dewarped region 2b. Region 514 (2c) is a registered region from frame 2 of the wide-angle image 402.

Figure 5B:
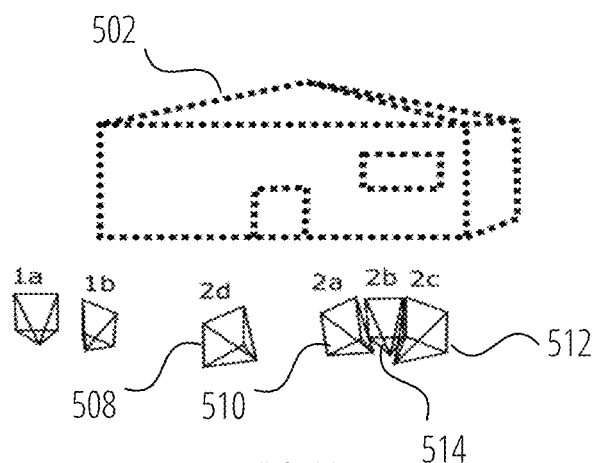
Figure 5C:
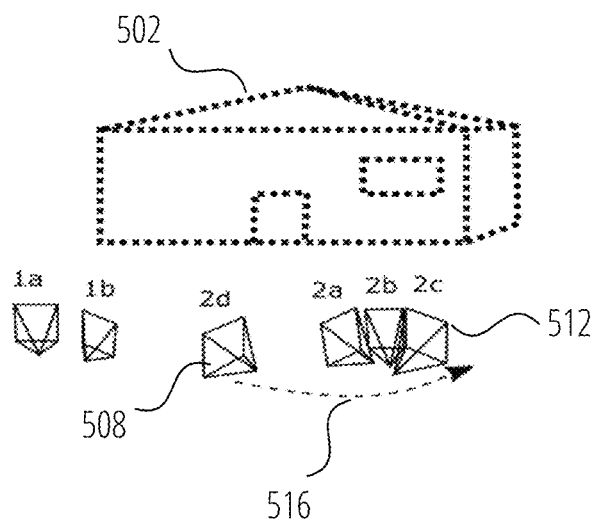

As shown in FIG. 5B, newly registered region 514 (2b) is shown to fit between regions 510 (2a) and 512 (2c), thus providing consensus with regions 510 (2a) and 512 (2c) on the pose of frame 2 of the wide-angle image. As shown in FIG. 5C, it can now be inferred that region 508 (2d) is misregistered and it can be corrected as shown by arrow 516, so that region 508 is positioned next to region 512 (2c).

Figure 6:
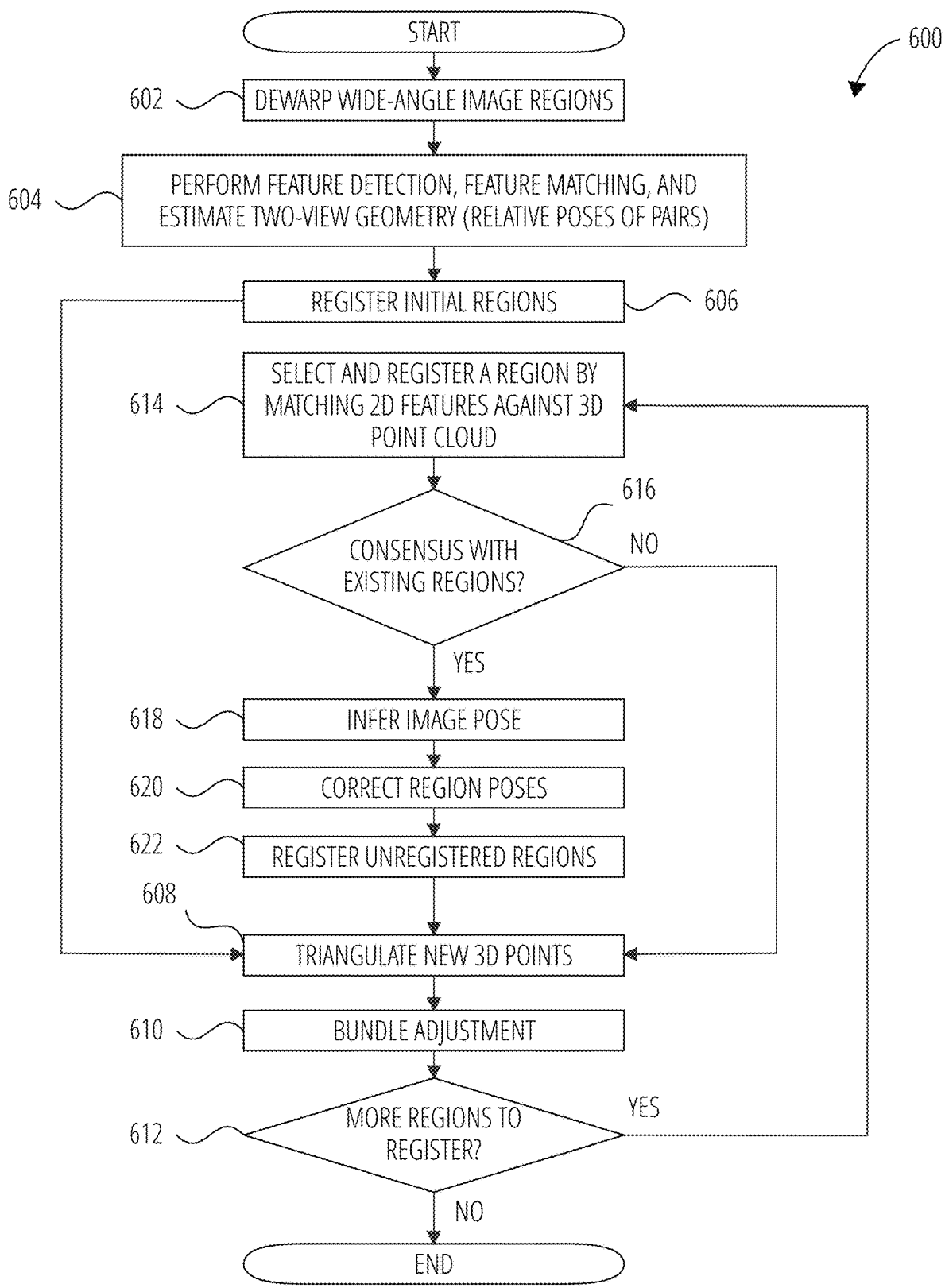
FIG. 6 is a flowchart illustrating a method of 3D reconstruction according to one example.

FIG. 6 shows a flow chart 600 illustrating a method of 3D reconstruction according to one example, performed by one or more processors or modules of the AR system 124.

The method commences at block 602, when a number of dewarped regions with known relative poses are generated from a number of wide-angle input images as described above with reference to FIG. 4.

The following SfM steps are then performed on the dewarped regions at block 604:

Image features, such as corner points, are detected in each dewarped region.

Image features are matched between dewarped regions to identify pairs of matched features. This matching is done between dewarped regions of the current frame and dewarped regions of one or more previous or subsequent frames of the wide-angle image. For the purpose of this matching, each dewarped region is treated as an independent image.

The relative poses of paired dewarped regions, having feature matches, is estimated. Note that in this case, these relative poses are not the known relative poses between regions in a single image frame, but are relative poses between pairs of dewarped regions determined from the recognition and comparison of 2D features common to image regions in different frames. For example, dewarped region 506 (1b) may include 2D features that are also found in dewarped region 510 (2a), allowing a relative pose between dewarped region 506 and dewarped region 510 to be determined.

The performance of these steps results in an output, for each dewarped region, of a set of 2D features and their matches with 2D features in other dewarped regions, as well as estimated relative poses between dewarped regions having 2D feature matches.

Two dewarped regions, having a higher number of matched features between them (so that there will be some confidence in their estimated relative pose) are then initially selected as registered regions at block 606. At this point in this example, the 3D point cloud 502 does not yet exist, although this method may also be used to supplement an existing point cloud. Accordingly, the method now passes to block 608 where 3D points for the point cloud 502 are generated by triangulating matched 2D features between the initially-registered regions as is known in the art.

The method then passes to block 610, where steps are now taken to optimize the region poses and 3D point positions in order to minimize the reprojection error, i.e. the error between the location of features in the region and the location of the corresponding 3D points when projected back into the regions in which they were observed. This optimization is a known technique in SfM and is called "Bundle Adjustment." After bundle adjustment, it is determined in decision block 612 as to whether or not there are more regions to register. If not, the method ends. If so, the method continues at block 614.

Another dewarped region is then selected and registered at block 614, by matching 2D features in the selected region with 3D points in the current 3D point cloud 502. Using the matched 2D/3D features a pose of this selected region is determined.

It is then determined whether or not there is consensus between this newly-registered region and other registered regions, or sensor data, from the same wide-angle image, at decision block 616. Consensus could for example be that N dewarped regions agree on the 3D pose of the source wide-angle image, or the newly registered region agreeing with Y dewarped regions that agree with reported location sensor data and/or motion sensor data associated with the wide-angle image 402. After a number of images/regions with associated GPS data (obtained from the position components 938) have been registered then the real-world location of the point cloud and other registered regions can be inferred. The amount of agreement required is configurable by the user.

In the first case it may be specified that at least four regions from the same wide-angle image are registered before inferring a pose of the wide-angle image that can be used to assess consensus. In the second case it may be specified that consensus with new regions can be determined once two registered regions agree on the pose of the source wide-angle image within 10 cm (for example) of each other and within five meters (for example) of location sensor data (e.g. location reported by the GPS receiver and depending on reported GPS accuracy). Similarly, it may be specified that consensus with new regions can be determined once the poses of two regions agree within five degrees (for example) of the poses inferred from motion sensor data, e.g. orientation obtained or derived from accelerometers, gyroscopes, magnetometers etc.

The poses of different dewarped regions from the same image frame can be compared with each other because their relative poses are known as described above, and the pose of dewarped regions can be compared with location or motion sensor data because the 3D model can be anchored to the real world, and the pose of each region is known with respect to the camera frame. If there is consensus in block 616, the method proceeds to block 618.

If consensus is not determined in decision block 616, the method proceeds to block 608 where the currently selected region is used to triangulate new 3D points to further generate the 3D point cloud 502, based on the 2D feature matching performed in block 604. The method then passes to block 610, where bundle adjustment is now performed on the registered regions to optimize image region poses and 3D point positions. After bundle adjustment, it is determined in decision block 612 as to whether or not there are any more dewarped regions of any more image frames to register. If not, the method ends. If so, the method continues at block 614.

Returning now to decision block 616, if consensus has been determined for a group of regions of a particular wide-angle image, the pose of that wide-angle image is then inferred at block 618. Once an estimate of the poses of registered regions having consensus is known, and since the relative pose between each registered region in the same frame and the wide-angle image is known, then the estimated pose of the wide-angle image can be inferred from the poses of registered regions of the same frame having consensus. An average of these estimated poses for each registered region of the same frame and for which consensus has been determined is then done to generate a best guess as to the true pose of the source wide-angle image. As used herein, the term average is defined as a number that measures the central tendency of a given set of numbers, including but not limited to a weighted or unweighted mean or median.

At block 620, the poses of each of the currently registered regions for the particular wide-angle image is then corrected (see FIG. 5C) by setting the pose for each of the registered regions to the image pose determined in block 618, with appropriate adjustments in each case to take account of the relative positioning of each registered region. In this way, the pose of dewarped regions that are not in the group of dewarped regions having consensus between their estimated poses is derived from the pose of the wide-angle image.

At block 622, currently unregistered regions of the particular wide-angle image are registered. This is the process of forcing the registration of regions of a wide-angle image (with a known pose) that have not already been registered. After the pose of the wide-angle image has been inferred in block 618, the pose of any regions that aren't already registered can be specified by setting the pose for each of the unregistered regions to the image pose determined in block 618, with appropriate adjustments in each case to take account of the relative positioning of each registered region. This is faster than waiting for unregistered regions to be registered via blocks 614 to 620.

The method then proceeds to block 608, where the currently selected region is used to triangulate new 3D points to further generate the 3D point cloud 502, based on the 2D feature matching performed in block 604.

At this point, after the image pose for the particular wide-angle image has been inferred in block 618, the image region poses have been corrected as in block 620 and unregistered regions have been registered in block 622, the poses of the image regions for the particular wide-angle image are rigidly fixed relative to the inferred pose of the wide-angle image. That is, individual image region poses for this particular wide-angle image can only be adjusted based on a change in the inferred pose of the particular wide-angle image.

The method then passes to block 610, where bundle adjustment is now performed to optimize the image pose and 3D point positions in order to minimize the reprojection error. It is worth noting that the bundle adjustment that is performed in block 610 is different depending on whether the method arrived at block 610 from "no consensus" in block 616 or from block 622. In the former case, before consensus is obtained on the pose of a wide-angle image, the poses of the regions are optimized independently in block 610. This is slower but provides robustness—if one region is in the wrong place it doesn't affect the others. Once there is consensus on the pose of a wide-angle image and the regions are rigidly fixed relative to that pose, only the pose of the image is optimized, which is faster than optimizing regions independently. Since the relative poses of dewarped regions in the same frame are known, reprojection errors can be determine by reprojecting 3D points into the dewarped region in which corresponding 2D features are found.

After bundle adjustment on the pose of the particular wide-angle image, it is determined in decision block 612 as to whether or not there are any more dewarped regions of any more wide-angle images to register. If not, the method ends. If so, the method returns to block 614.

The output of the optimization that is performed in 610 is the 3D point cloud 502 and the final poses for all regions and images that have been successfully registered. The 3D point cloud 502 may be used as described below with reference to FIG. 7. The 3D point cloud 502 may be stored on the client device 102 for use in ongoing SfM or augmented reality operations and/or it may be uploaded to the application server 112 to create or supplement a 3D point cloud hosted on the application server 112.

Figure 7:
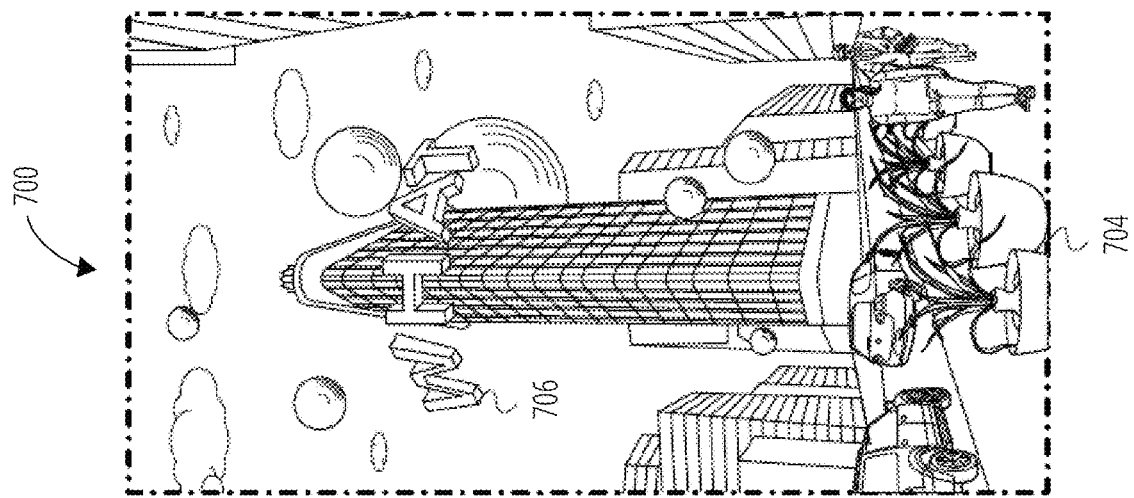
FIG. 7 illustrates an interface flow-diagram according to one example.
Figure 7:
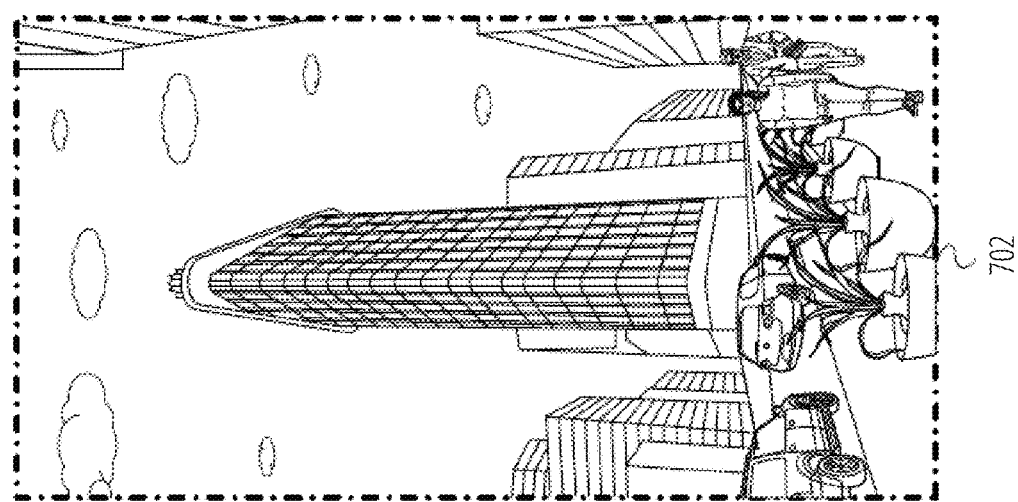

FIG. 7 is an exemplary interface flow-diagram 700 illustrating the display of location-based AR content presented by the client device 102, according to certain example embodiments. As seen in FIG. 7, the interface flow diagram includes an interface diagram 702 and an interface diagram 704.

In one example, the client device 102 may cause display of a presentation of the interface diagram 702 on a display of the client device 102. For example, the client device 102 may capture image data via a camera and generate the interface depicted by the interface diagram 702.

As seen in the interface diagram 704, the client device 102 may access media content within a repository (e.g., the databases 120) based on the location of the client device 102. The media content (e.g. the media content 706), comprising virtual objects or other enhancing information or images, may be associated with the location within a media repository, such that reference to the location within the repository may identify the media content 706. Alternatively, the media content may be located in memory of the client device 102. The media content may also be identified by user preference or selection.

The client device 102 may then, based on a localization or tracking pose generated from images captured by the client device 102 and the 3D cloud generated in flowchart 600, cause display of a presentation of the media content 706 at a position within a GUI as seen in the interface diagram 704.

SOFTWARE ARCHITECTURE

Figure 8:
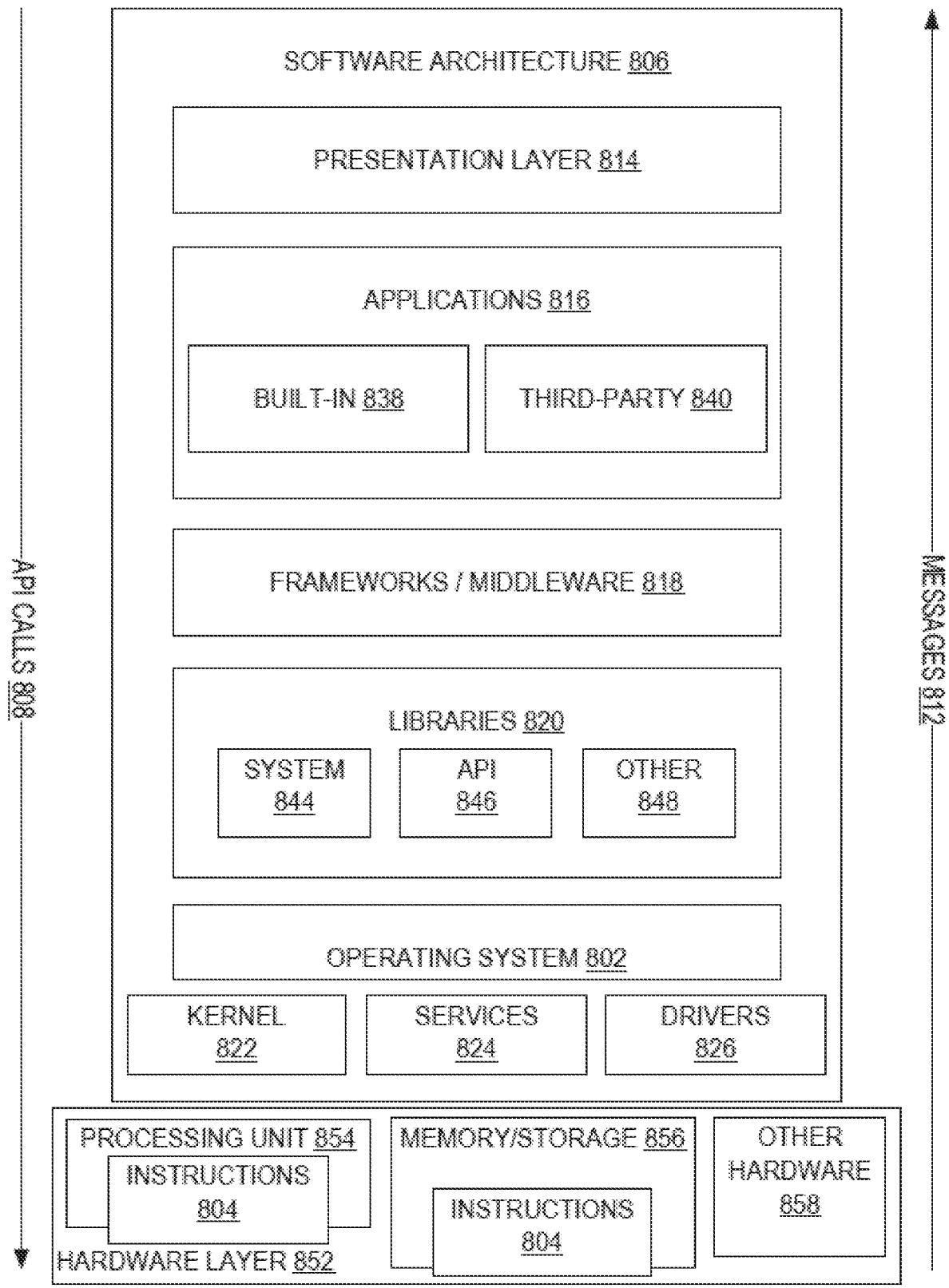
FIG. 8 is a block diagram illustrating a representative software architecture, which may be used in conjunction with various hardware architectures herein described and used to implement various embodiments.

FIG. 8 is a block diagram illustrating an example software architecture 806, which may be used in conjunction with various hardware architectures herein described. FIG. 8 is a non-limiting example of a software architecture and it will be appreciated that many other architectures may be implemented to facilitate the functionality described herein. The software architecture 806 may execute on hardware such as machine 900 of FIG. 9 that includes, among other things, processors 904, memory 914, and I/O components 918. A representative hardware layer 852 is illustrated and can represent, for example, the machine 800 of FIG. 8. The representative hardware layer 852 includes a processing unit 854 having associated executable instructions 804. Executable instructions 804 represent the executable instructions of the software architecture 806, including implementation of the methods, components and so forth described herein. The hardware layer 852 also includes memory and/or storage modules memory/storage 856, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, applications 816 and a presentation layer 814. Operationally, the applications 816 and/or other components within the layers may invoke application programming interface (API) API calls 808 through the software stack and receive a response as in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824 and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824 and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphic user interface (GUI) functions, high-level resource management, high-level location services, and so forth. The frameworks/middleware 818 may provide a broad spectrum of other APIs that may be utilized by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built in operating system functions (e.g., kernel 822, services 824 and/or drivers 826), libraries 820, and frameworks/middleware 818 to create user interfaces to interact with users of the system. Alternatively, or additionally, in some systems interactions with a user may occur through a presentation layer, such as presentation layer 814. In these systems, the application/component "logic" can be separated from the aspects of the application/component that interact with a user.

Figure 9:
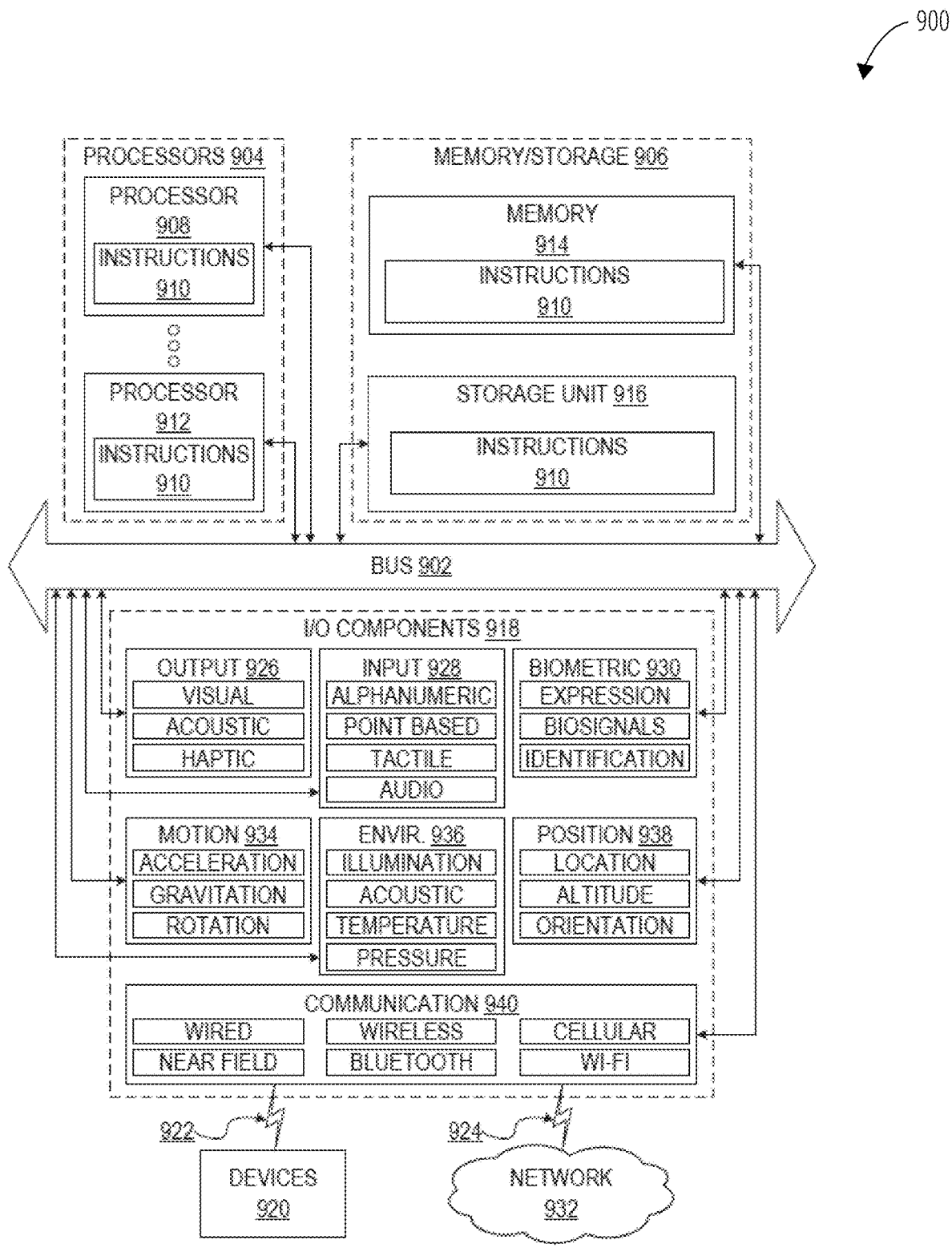
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory memory/storage 906, and I/O components 918, which may be configured to communicate with each other such as via a bus 902. The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like. The input components 928 may also include one or more image capture devices such as a camera. The camera may include a wide-angle lens (e.g. a fisheye, 360-degree panoramic lens or other lens that includes a deliberate distortion) from which the methods and systems described herein receive wide-angle images for processing.

In further example embodiments, the I/O components 918 may include biometric components 930, motion sensor components 934, environmental environment components 936, or position components 938 among a wide array of other components. For example, the biometric components 930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion sensor components 934 may include acceleration sensor components (e.g., accelerometer), gravitation sensor components, rotation sensor components (e.g., gyroscope), and so forth. The environment components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a Global Position system (GPS) receiver component), altitude sensor components (e.g., altimeters or barometers that detect air pressure from which altitude may be derived), orientation sensor components (e.g., magnetometers), and the like. In this regard it should be noted that a magnetometer can be considered as both an orientation sensor and a motion sensor, since a change in the magnetometer's output is also indicative of rotational motion.

Communication may be implemented using a wide variety of technologies. The I/O components 918 may include communication components 940 operable to couple the machine 900 to a network 932 or devices 920 via coupling 922 and coupling 924 respectively. For example, the communication components 940 may include a network interface component or other suitable device to interface with the network 932. In further examples, communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a Universal Serial Bus (USB)).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as, location via Internet Protocol (IP) geo-location, location via Wi-Fi® signal triangulation, location via detecting a NFC beacon signal that may indicate a particular location, and so forth.

GLOSSARY

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"LIFT" in this context is a measure of the performance of a targeted model at predicting or classifying cases as having an enhanced response (with respect to a population as a whole), measured against a random choice targeting model.

"PHONEME ALIGNMENT" in this context, a phoneme is a unit of speech that differentiates one word from another. One phoneme may consist of a sequence of closure, burst, and aspiration events; or, a diphthong may transition from a back vowel to a front vowel. A speech signal may therefore be described not only by what phonemes it contains, but also the locations of the phonemes. Phoneme alignment may therefore be described as a "time-alignment" of phonemes in a waveform, in order to determine an appropriate sequence and location of each phoneme in a speech signal.

"AUDIO-TO-VISUAL CONVERSION" in this context refers to the conversion of audible speech signals into visible speech, wherein the visible speech may include a mouth shape representative of the audible speech signal.

"TIME DELAYED NEURAL NETWORK (TDNN)" in this context, a TDNN is an artificial neural network architecture whose primary purpose is to work on sequential data. An example would be converting continuous audio into a stream of classified phoneme labels for speech recognition.

"BI-DIRECTIONAL LONG-SHORT TERM MEMORY (BLSTM)" in this context refers to a recurrent neural network (RNN) architecture that remembers values over arbitrary intervals. Stored values are not modified as learning proceeds. RNNs allow forward and backward connections between neurons. BLSTM are well-suited for the classification, processing, and prediction of time series, given time lags of unknown size and duration between events.

What is claimed is:

1. A method of determining a pose of a first wide-angle image using one or more processors, comprising:
    dewarping regions of the first wide-angle image;
    dewarping regions of a second wide-angle image;
    detecting image features in the dewarped regions of the first wide-angle image and in the dewarped regions of the second wide-angle image;
    identifying pairs of matching image features between dewarped regions of the first wide-angle image and dewarped regions of the second wide-angle image;
    determining relative poses between dewarped regions of the first wide-angle image and dewarped regions of the second wide-angle image having pairs of matching image features;
    triangulating pairs of matching image features to generate 3D point locations of the matching image features;
    determining estimated poses of the dewarped regions of the first wide-angle image from the 3D point locations of the matching image features; and
    deriving a pose of the first wide-angle image from the estimated poses of the dewarped regions of the first wide-angle image.

2. The method of claim 1, wherein determining estimated poses comprises:
    determining a group of dewarped regions of the first wide-angle image having consensus between their estimated poses; and
    deriving the pose of the first wide-angle image from the estimated poses of the dewarped regions having such consensus.

3. The method of claim 2 further comprising:
    deriving the pose of dewarped regions of the first wide-angle image that are not in the group of dewarped regions having consensus between their estimated poses from the pose of the first wide-angle image.

4. The method of claim 2, further comprising:
    determining consensus of dewarped regions of the first wide-angle image based on agreement of the estimated poses with location sensor data or motion sensor data.

5. The method of claim 2, further comprising:
    determining consensus of a particular dewarped region of the first wide-angle image based on agreement of an estimated pose of the particular dewarped region with an estimated pose based on the estimated poses of a predetermined number of dewarped regions of the first wide-angle image having consensus between their estimated poses.

6. The method of claim 1 further comprising:
    optimizing the estimated poses of dewarped regions.

7. The method of claim 6 further comprising optimizing the pose of the first wide-angle image after optimizing the estimated poses of the dewarped regions.

8. A data processing system comprising:
    one or more processors;
    a wide-angle image capture device, and
    one or more machine-readable mediums storing instructions that, when executed by the one or more processors, cause the system to perform operations comprising:
        dewarping regions of a first wide-angle image;
        dewarping regions of a second wide-angle image;
        detecting image features in the dewarped regions of the first wide-angle image and in the dewarped regions of the second wide-angle image;
        identifying pairs of matching image features between dewarped regions of the first wide-angle image and dewarped regions of the second wide-angle image;
        determining relative poses between dewarped regions of the first wide-angle image and dewarped regions of the second wide-angle image having pairs of matching image features;
        triangulating pairs of matching image features to generate 3D point locations of the matching image features;
        determining estimated poses of the dewarped regions of the first wide-angle image from the 3D point locations of the matching image features; and
        deriving a pose of the first wide-angle image from the estimated poses of the dewarped regions of the first wide-angle image.

9. The data processing system of claim 8, wherein the operation of determining estimated poses comprises:
    determining a group of dewarped regions of the first wide-angle image having consensus between their estimated poses; and
    deriving the pose of the first wide-angle image from the estimated poses of the dewarped regions having such consensus.

10. The data processing system of claim 9, wherein the operations further comprise:
    deriving the pose of dewarped regions of the first wide-angle image that are not in the group of dewarped regions having consensus between their estimated poses from the pose of the first wide-angle image.

11. The data processing system of claim 9, wherein the operations further comprise:
   determining consensus of dewarped regions of the first wide-angle image based on agreement of the estimated poses with location sensor data or motion sensor data.

12. The data processing system of claim 9, wherein the operations further comprise:
   determining consensus of a particular dewarped region of the first wide-angle image based on agreement of an estimated pose of the particular dewarped region with an estimated pose based on the estimated poses of a predetermined number of dewarped regions of the first wide-angle image having consensus between their estimated poses.

13. The data processing system of claim 8, wherein the operations further comprise:
   optimizing the estimated poses of dewarped regions.

14. The data processing system of claim 13, wherein the operations further comprise:
   optimizing the pose of the first wide-angle image after optimizing the estimated poses of the dewarped regions.

15. A non-transitory machine-readable medium including instructions which, when read by a machine, cause the machine to perform operations for determining a pose of a first wide-angle image, the operations comprising:
   dewarping regions of the first wide-angle image;
   dewarping regions of a second wide-angle image;
   detecting image features in the dewarped regions of the first wide-angle image and in the dewarped regions of the second wide-angle image;
   identifying pairs of matching image features between dewarped regions of the first wide-angle image and dewarped regions of the second wide-angle image;
   determining relative poses between dewarped regions of the first wide-angle image and dewarped regions of the second wide-angle image having pairs of matching image features;
   triangulating pairs of matching image features to generate 3D point locations of the matching image features;
   determining estimated poses of the dewarped regions of the first wide-angle image from the 3D point locations of the matching image features; and
   deriving a pose of the first wide-angle image from the estimated poses of the dewarped regions of the first wide-angle image.

16. The non-transitory machine-readable medium of claim 15 wherein the operation of determining estimated poses comprises:
   determining a group of dewarped regions of the first wide-angle image having consensus between their estimated poses; and
   deriving the pose of the first wide-angle image from the estimated poses of the dewarped regions having such consensus.

17. The non-transitory machine-readable medium of claim 16, wherein the operations further comprise:
   deriving the pose of dewarped regions of the first wide-angle image that are not in the group of dewarped regions having consensus between their estimated poses from the pose of the first wide-angle image.

18. The non-transitory machine-readable medium of claim 16, wherein the operations further comprise:
   determining consensus of dewarped regions of the first wide-angle image based on agreement of the estimated poses with location sensor data or motion sensor data.

19. The non-transitory machine-readable medium of claim 15, wherein the operations further comprise:
   determining consensus of a particular dewarped region of the first wide-angle image based on agreement of an estimated pose of the particular dewarped region with an estimated pose based on the estimated poses of a predetermined number of dewarped regions of the first wide-angle image having consensus between their estimated poses.

20. The non-transitory machine-readable medium of claim 17 wherein the operations further comprise:
   optimizing the estimated poses of dewarped regions individually; and
   optimizing the pose of the first wide-angle image after optimizing the estimated poses of the dewarped regions individually.

* * * * *